T. HILTON.

Tree-Protector.

No. 46,298.  Patented Feb. 7, 1865.

Witnesses:
Benj. F. Thurston
John St. Shiress

Inventor:
Theophilus Hilton

UNITED STATES PATENT OFFICE.

THEOPHILUS HILTON, OF PROVIDENCE, ASSIGNOR TO HIMSELF AND WM. D. HILTON, OF CRANSTON, RHODE ISLAND.

IMPROVEMENT IN TREE-PROTECTORS.

Specification forming part of Letters Patent No. 46,298, dated February 7, 1865.

*To all whom it may concern:*

Be it known that I, THEOPHILUS HILTON, of the city and county of Providence, in the State of Rhode Island, have invented a new and useful Improvement in Protectors for Trees against Insects; and I do hereby declare that the following specification, taken in connection with the drawings making a part of the same, is a full, clear, and exact description thereof.

Figure 1:
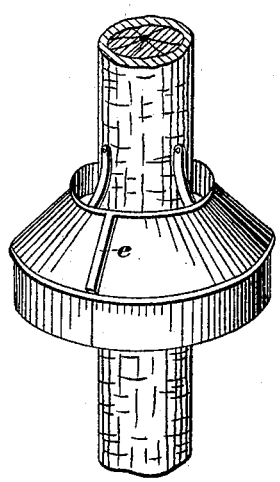
Figure 2:
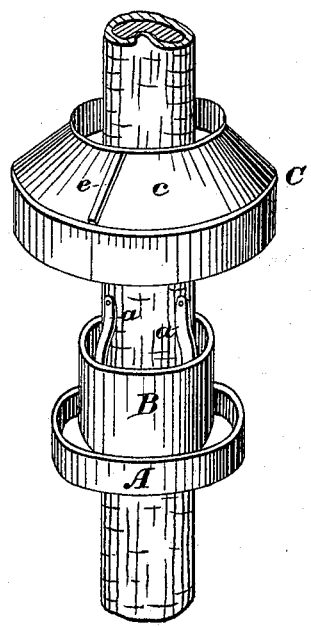
Figure 3:
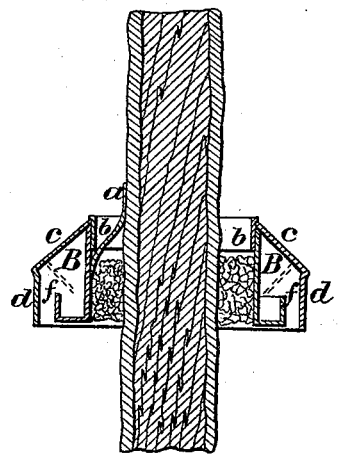

Figure 1 is a view in perspective of the protector attached to the trunk of a tree. Fig. 2 represents the two parts of which the protector is composed—the hood and the trough—the former being shown elevated for the purpose of cleaning the latter. Fig. 3 is a longitudinal and vertical section in a plane through the axis of the protector.

It is well known that the moths which deposit their eggs upon the limbs of trees, and from which eggs the canker-worm is hatched, whose ravages are so destructive to vegetation, emerge from the ground, where the burrows of their parent worm are made, during the autumn or early spring for the purpose of finding new places for the reproduction of their species. The females, unlike the males, are wingless, and crawl up the trunks of trees to find a convenient place to deposit their eggs, which upon the approach of summer are developed into caterpillars. The proper time to cause their destruction is before the eggs are deposited and while the female is pursuing her instinct to provide for a succession of her kind.

My invention is designed to accomplish this object, and is as follows:

A, Fig. 2, is a circular trough which surrounds the trunk of the tree, and should have its internal diameter considerably greater than the trunk, so as to allow for the growth of the latter. This trough has a collar, B, which is several inches higher than the portion which forms the trough, and has attached to it metallic straps *a a* for securing the whole to the trunk. The space between the trunk and the collar should be stuffed with oakum, or some material which will obstruct the passage of the moths, and the trough should be filled with oil or other fluid to arrest their further progress if they crawl into it.

C is a hood, consisting of a flange or collar, *b*, a roof, *c*, and a lip, *a*, Fig. 3. It surrounds the trunk of the tree and is supported by the collar B of the trough, as shown in Fig. 3. Its office is twofold—first, to protect the trough against the accumulation of dirt and leaves, which in too great quantity would destroy its efficiency by affording a means of passage for the moths; and, secondly, in case that any moth is able to crawl up the side of the collar B the roof *c* will prevent it from reaching the trunk of the tree and compel it to descend toward the ground. Whenever it is desired to do so the hood can be easily raised from the trough for facilitating the cleaning or refilling of the latter, as shown clearly in Fig. 2. I propose, also, at times to construct the hood with an additional flange, *f*, as shown in red lines, Fig. 3, placed at an angle with the roof sufficiently acute to cause the moth, in case it has succeeded in passing the trough and crawled up the collar and down the under side of the roof, to be conducted again toward the trough instead of toward the ground.

To enable me to place the apparatus around the trunk of trees I make the trough and its collar with a seam, so that it can be opened in adjusting it to the trunk. This seam, after the protector is in place, I close with a batten of tin bedded in insoluble cement, which is held by screw-bolts to each side of the joint. The hood is also seamed for the same purpose. The edges, however, are turned back, so as to allow the clasp *e* to unite the two and cover the joint.

What I claim as my invention, and desire to secure by Letters Patent, is—

1. The hood C for a tree-protector, composed of the flange *b*, roof *c*, and lip *a*, and united by means of a clasp *e*, the whole constructed substantially as described.

2. The construction of a hood, as described, or its equivalent, with a trough or its equivalent encircling the trunk of a tree, substantially as and for the purpose specified.

THEOPHILUS HILTON.

Witnesses:
BENJ. F. THURSTON,
JOHN H. STINESS.